Figure 3:
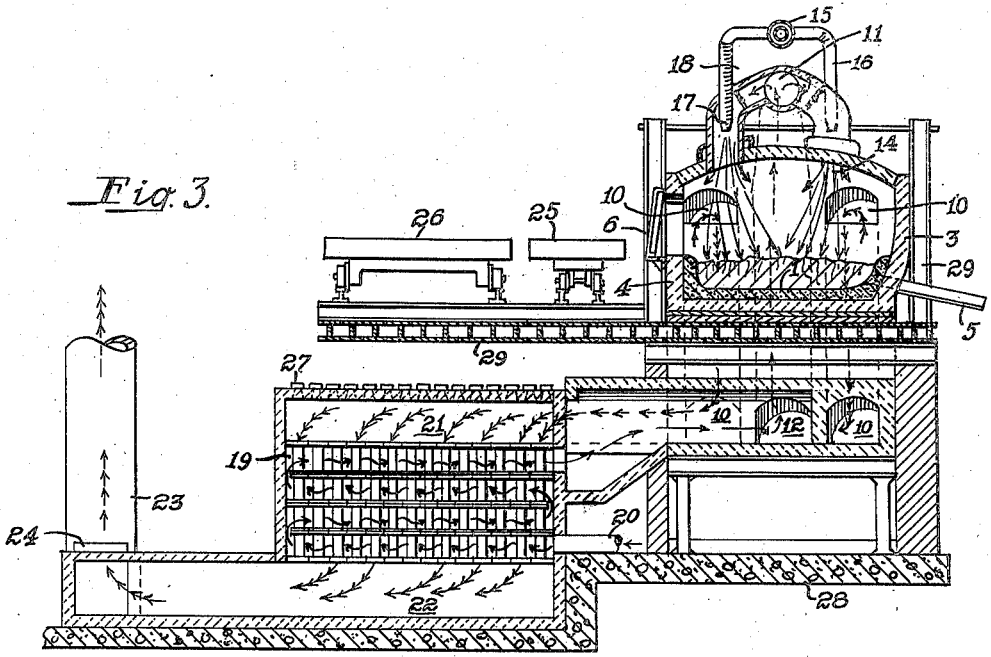

Aug. 9, 1938.    W. A. MORTON    2,126,272
OPEN HEARTH FURNACE
Filed May 8, 1937    2 Sheets-Sheet 1
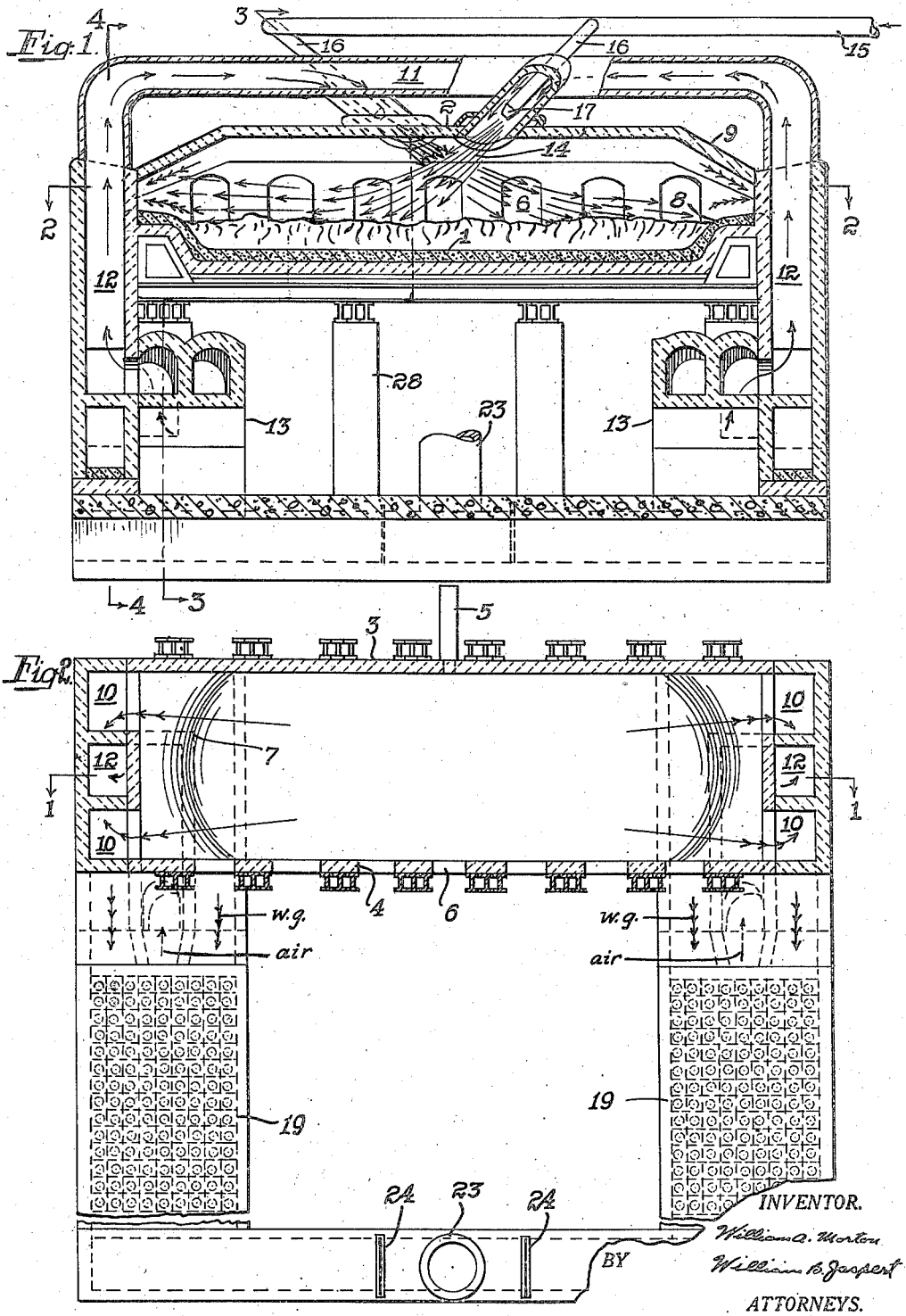

INVENTOR.
William A. Morton
BY William B. Jaspert
ATTORNEYS.

Patented Aug. 9, 1938

2,126,272

UNITED STATES PATENT OFFICE 2,126,272

OPEN HEARTH FURNACE

William A. Morton, Mount Lebanon, Pa., assignor to Amco, Incorporated, Pittsburgh, Pa., a corporation of Pennsylvania Application May 8, 1937, Serial No. 141,444

6 Claims. (Cl. 263—15)

This invention relates to new and useful improvements in open hearth furnaces, more particularly to a method of firing such furnaces whereby the application of the heating medium to the materials on the hearth is uniform, constant and of high heating properties.

Figure 4:
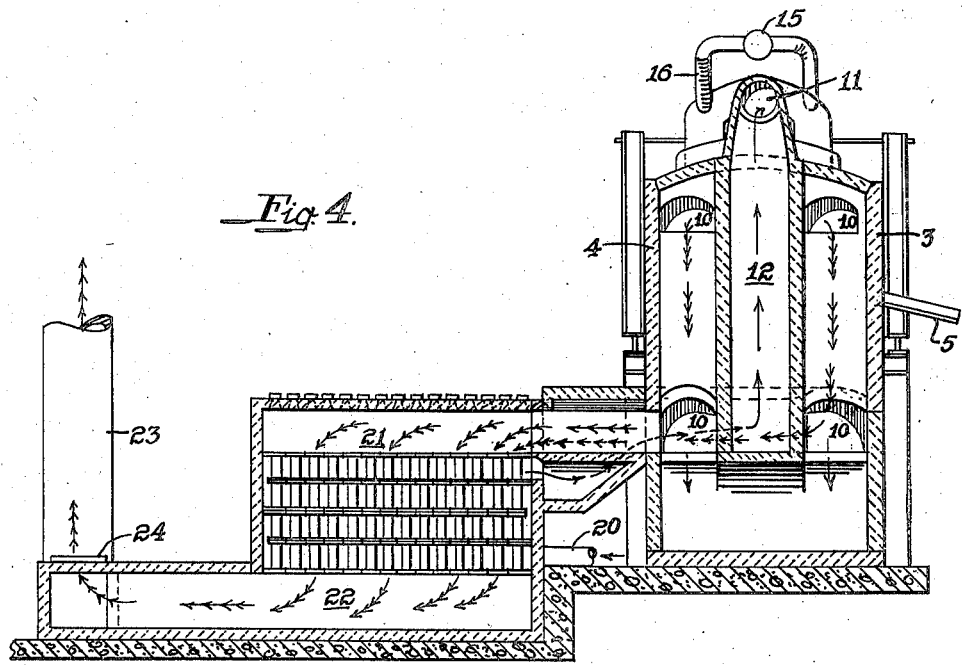

These and other objects of the invention will become more apparent from a consideration of the accompanying drawings constituting a part hereof in which like reference characters designate like parts and in which:

Fig. 1 is a vertical cross-sectional view taken longitudinally of the furnace along the line 1—1, Fig. 2;

Fig. 2 a horizontal cross-section through the heating chamber taken along the line 2—2, Fig. 1;

Fig. 3 a vertical section taken transversely of the furnace along the line 3—3, Fig. 1; and Fig. 4 a vertical section transversely of the furnace taken along the line 4—4, Fig. 1.

With reference to the several figures of the drawings, the numeral 1 designates the hearth upon which the metal to be melted is charged; 2 the roof or ceiling of the furnace; 3 and 4 the sidewalls, the former being provided with a flow spout 5 and the latter with charging doors or opening 6.

The ends of the hearth are curved, as shown in Fig. 2 at 7, and terminate in a lip or shoulder 8, Fig. 1, which, together with the downwardly deflecting portion 9 of the roof 2, form throated passages for the exit of the products of combustion, there being two of such exits 10 at each end of the furnace, as shown in Fig. 2 of the drawings.

Above the roof 2 of the furnace is a preheat air passage 11 extending the full length of the furnace, and terminating at its ends in vertical passages 12 that are in heat exchange relation with the waste gas exit passages 10 for a substantial distance, all of said passages leading to recuperator structures 13. The passage 11 constitutes a manifold having a pair of longitudinally spaced openings 14, Figs. 1 and 3, through which the preheated air is delivered to the furnace chamber. Above the air manifold 11 is a fuel manifold 15 having off-takes 16 extending through the air outlets 14 of the furnace. The members 16 are water-cooled and terminate in fuel nozzles 17, for injecting gaseous fuel into the preheated air supply at the point of delivery of the latter to the furnace chamber. Regulating dampers 18 are provided to control the volume of preheated air for each individual burner.

The waste gas and preheated air passages 10 and 12, respectively, communicate with a recuperator tile structure, generally designated by the reference numeral 19 and which, as shown in Figs. 3 and 4, is provided with an air inlet 20 from which the air passes in horizontal paths, as shown by arrows, into the vertical air passage 12. The waste gases enter the recuperator from the vertical exit passages 10, into a collecting chamber 21 above the recuperator tile, from which the products of combustion pass downwardly into a second chamber 22, thence to a stack 23, a damper 24 being provided to regulate the draft.

Charging cars 25 and 26 are provided, as shown in Fig. 3, this being standard equipment. Plugs 27 cover poke holes for cleaning the recuperator tile, and the masonry 28 and structural steel members 29 are of the conventional construction.

The operation of the above-described furnace is briefly as follows: The hearth is charged with scrap metal, billets and other materials essential to the proper melting and refining of steel in open hearth practice, and the burners are ignited to obtain a combination or arrangement of firing into a continuously clearing atmosphere.

In the drawings, the products of combustion are designated by multiple arrows and the preheated air by single arrows. The fuel delivered by the burners 17 is mixed with the preheated air from the manifold 11 preliminary to the passing of the combustible mixture into the furnace chamber. This is apparent from the relation of the burner nozzles and air passages 17 and 14, respectively, of Fig. 3. By applying the heat to substantially the center of the furnace and distributing it unidirectionally throughout its longitudinal extent by exhausting the products of combustion at the ends of the furnace through the exits 10, any desirable temperature condition is obtainable in the open hearth furnace chamber.

As is apparent from Figs. 1 and 3 of the drawings, the firing ports 14 are inclined from the vertical to impinge the melting flame from opposite directions of the furnace against the materials supported upon the furnace hearth. By locating the firing ports 14 on opposite sides of the longitudinal centerline of the furnace, the products of combustion of the separate firing ports will not commingle, but will each exhaust lengthwise of the furnace in the direction of the waste gas exits 10, at opposite ends of the furnace. This non-commingling of the products of combustion from the several burners permits complete combustion to take place as the products of combustion are travelling into atmosphere in the furnace which is continuously cleared of excess carbon dioxide. In this way, the maximum potential flame temperatures are available by avoiding dilution of the incoming combustibles with waste gases.

Also by the vertical extent of travel of the preheated air in heat exchange relation with the waste gas exits 10, as is clearly shown in Fig. 4 of the drawings, a much higher preheat is obtainable than where the preheat characteristics of the recuperator alone are relied upon. This is very important in obtaining the high melting temperature conditions prevailing in open hearth melting and refining operations. By regulating the dampers 18, any desired volume of preheated air is obtainable at the respective burner openings, and by regulating draft dampers 24, any desirable distribution of waste gases through the recuperators at the respective ends of the furnace is obtainable.

It will be apparent from the foregoing description of the operation of the furnace that uniformity of temperature conditions and proper distribution of heat with the highest obtainable preheat values of air are obtainable by the superheating flue arrangement. By the arrangement of the preheat air and waste gas passages to obtain maximum length of travel in heat exchange relation, most economical operation is obtainable through the conservation of heat, and because of the high preheat values obtainable the furnace may be operated to obtain maximum efficiency.

Although one embodiment of the invention has been herein illustrated and described, it will be obvious to those skilled in the art that various modifications may be made in the details of construction without departing from the principles herein set forth.

I claim:

1. The method of melting and refining steel in an open hearth furnace which comprises placing a charge on the hearth structure, directing a plurality of transversely spaced oppositely disposed heating flames toward outlets adjacent the end walls of the furnace and at an inclination downward against the surface of the charge in the furnace, and removing the products of combustion from said respective flames at substantially the level of the charge.

2. The method of melting and refining steel in an open hearth furnace which comprises placing a charge on the furnace hearth, directing a pair of melting flames downwardly from the top of the furnace chamber in opposite directions along the longitudinal extent of the chamber in transversely and longitudinally spaced relation, and simultaneously withdrawing all the products of combustion from the respective melting flames to opposite ends of the furnace chamber.

3. The method of melting and refining steel in an open hearth furnace which comprises placing a charge on the furnace hearth, directing a melting flame from the top on one side of the longitudinal centerline of the furnace chamber, against the surface of the charge, directing another melting flame from the top on the opposite side of the longitudinal centerline and in longitudinal spaced relation to said first-named flame, and withdrawing the products of combustion from both of said flames simultaneously at the ends of said furnace in substantially equal volumes.

4. In an open hearth furnace, a pair of waste gas exit ports at opposite ends of the furnace, a plurality of inclined firing ports in the roof of the furnace intermediate the waste gas exit ports, a manifold connecting said firing ports for conducting preheated air thereto, a second manifold extending to said ports for conducting a gaseous fuel thereto, means for separately regulating the volume of air delivered to said ports, and means for regulating the fuel supply to said individual ports whereby the ports are adapted to continuously supply heat flames of uniform length and intensity undirectionally throughout the entire area of the furnace chamber, said firing ports being spaced on opposite sides of the longitudinal centerline of the furnace and being inclined toward opposite ends of the furnace to thereby direct the products of combustion into a continuously clearing atmosphere.

5. In an open hearth furnace, a pair of waste gas exit ports at opposite ends of the furnace, a plurality of firing ports in the roof of the furnace intermediate the waste gas exit ports, a preheated air passage connecting said firing ports and extending from end to end of the furnace above the furnace roof, thence downwardly along the end walls of the furnace in heat exchange relation with the waste gas exits of the furnace, and a pair of recuperators, one of which is connected to the respective ends of the preheated air passage and to the waste gas passages of the furnace.

6. In an open hearth furnace, a hearth, roof and side walls forming a melting chamber having waste gas exits at the respective ends of the chamber, a plurality of recuperators communicating with the waste gas exits of said chamber, a preheated air passage extending from the recuperators between the waste gas exit passages of the furnace and across the length of the furnace above the roof thereof, firing ports extending from the preheated air passage through the roof of the furnace, fuel burners extending into said ports, and means for regulating the heat characteristics of the several burner ports.

WILLIAM A. MORTON.